United States Patent [19]
Gehm et al.

[11] Patent Number: 5,697,325
[45] Date of Patent: Dec. 16, 1997

[54] MILKING SYSTEM

[76] Inventors: Lanny Gehm, 9502 Rte. 79; William Gehm, 149 Abbott Rd., both of Lisle, N.Y. 13797

[21] Appl. No.: 387,694
[22] Filed: Feb. 13, 1995
[51] Int. Cl.$^6$ .................................................. A01J 5/00
[52] U.S. Cl. ........................................................ 119/14.28
[58] Field of Search .......................... 119/14.27, 14.28, 119/14.29, 14.3, 14.31, 14.32, 14.33, 14.34, 14.35

[56] References Cited

U.S. PATENT DOCUMENTS

| | | | |
|---|---|---|---|
| 1,332,318 | 3/1920 | Bower | 119/14.41 |
| 2,160,651 | 5/1939 | Erling | 119/14.41 |
| 3,900,005 | 8/1975 | Goldsmith | 119/14.41 |
| 5,207,177 | 5/1993 | Lidman | 119/14.28 |
| 5,218,924 | 6/1993 | Thompson et al. | 119/14.02 |

*Primary Examiner*—Thomas Price
*Attorney, Agent, or Firm*—Salzman & Levy

[57] ABSTRACT

The present invention features an improved milking system that provides a precise, delineated transition between the pressure and vacuum phases of a pulsator mechanism. The system features a two-valve control that provides a sharp transition between the alternating air pressure and vacuum that are supplied to a teat cup. One valve of the pulsator mechanism controls the vacuum inlet; the other valve controls the atmospheric air inlet. The electronics actuating the valves alternates the air and vacuum supplied to the pulsator outlet, so that the vacuum and atmospheric air sources are never simultaneously connected to the pulsator outlet.

9 Claims, 5 Drawing Sheets

MILKING SYSTEM

FIELD OF THE INVENTION

The present invention pertains to an improved milking system for domesticated animals and, more particularly, to a milking system that features two independent valves for alternating between the pressurizing and vacuum cycles of the teat cup, as well as electronic controls for independently actuating said atmospheric pressure and vacuum cycles.

BACKGROUND OF THE INVENTION

Typical milking systems apply periodic alternating pressure to the teat cup of a milking apparatus. This results in the removal and the flow of milk from the udder to which the teat cup is applied. The alternating pressure between the atmospheric pressure and vacuum cycles is controlled by a two-way valve combination that feeds a pulsation chamber. This valving apparatus is commonly referred to as a pulsator.

The typical milking system integrates the pulsator with a teat cup and claw. The teat cup contains an inflatable liner that, when alternately pressurized and depressurized, causes the udder to release its milk. The milk then flows into the claw, which comprises a hollow chamber that serves as the collection unit for a plurality of teat cups (four, usually). Milk gathered by the claw is then transported to a series of hoses and pipes, terminating at a storage tank.

Several problems exist in using the current valve controls of contemporary milking systems. Overlap of the pressure and vacuum phases of the milking operation can result in unwanted pressure impacts on the teat. Some systems compensate for this by increasing the transition time between the vacuum and pressure cycles, so that these impacts will not occur. However, this procedure has the disadvantage of providing for an inadequate rest phase, which, in turn, causes the teat tissue to swell from excessive blood formation. This results not only in discomfort to the animal, but is also part of a condition known as "poor milk out", which results in teat damage and subsequent biological disease.

In a recent system, as illustrated in U.S. Pat. No. 5,207,177 (entitled "Pulsator" and issued to Magnus LIDMAN on May 4, 1993), a pulsator with two independent pulsation outlets is additionally controlled by a third valve that isolates the alternate switching between the pressure and vacuum cycles in the given pulsation chamber transitioning to the vacuum phase. This isolation prevents the evacuating air in the transitioning chamber from impacting the vacuum level in the other chamber, and it eliminates one of the sources of the aforementioned pressure overlap in the pulsator (as well as the resultant discomfort and damage to the animal).

The present invention seeks to improve today's milking system by minimizing the transition time between the pressure and vacuum cycles, while also ensuring that there is adequate separation between the pressure and vacuum cycles.

In the current invention, the vacuum and pressure cycles are separated by actuating one solenoid valve to control the inlet of the vacuum supply, and actuating another solenoid valve to control the inlet of the atmospheric air supply to the pulsator output. The controlling electronics completes the separation by providing cyclically timed signals to both solenoids, so as to ensure that each solenoid is turned on only after the other is turned off. This prevents both the vacuum and atmospheric air supplies from being simultaneously connected to the pulsator output, resulting in a consistent and sharp transition from one pressure supply to the other.

The inventive design is not obvious from the teachings of the prior art. In fact, some of the more recent prior art has attempted to accomplish the opposite effect. In each of the patents issued to GOLDSMITH (U.S. Pat. No. 3,900,005), and THOMPSON et al (U.S. Pat. No. 5,218,924), there is an attempt to lengthen the duration of the transition from the pressure phase to the vacuum phase.

The present invention's sharp transition from one pressure supply to the other minimizes any irritation and damage to the animal teats, and, furthermore, accomplishes this without the complexity of THOMPSON et al and GOLDSMITH.

SUMMARY OF THE INVENTION

In accordance with the present invention, there is provided an improved milking system that features a precise, delineated transition between the pressure and vacuum phases of a pulsator mechanism. The system comprises a two-valve control that provides a sharp transition between the alternating air pressure and vacuum that are supplied to a teat cup. One valve of the pulsator mechanism controls the vacuum inlet; the other valve controls the atmospheric air inlet. The electronics actuating the valves alternates the air and vacuum supplied to the pulsator outlet so that the vacuum and atmospheric air sources are never simultaneously connected to said pulsator outlet.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention pertains to a milking system having a pulsator unit that has separate pressure and vacuum channels. Each channel is controlled by its own respective valve. The first valve of channel A controls the vacuum inlet; the second valve of channel B controls the atmospheric air inlet. The electronics actuating the valves creates a sharp transition in the pulsator outlet between the atmospheric air and the vacuum, so that the vacuum and atmospheric air sources are never simultaneously connected.

Figure 1:
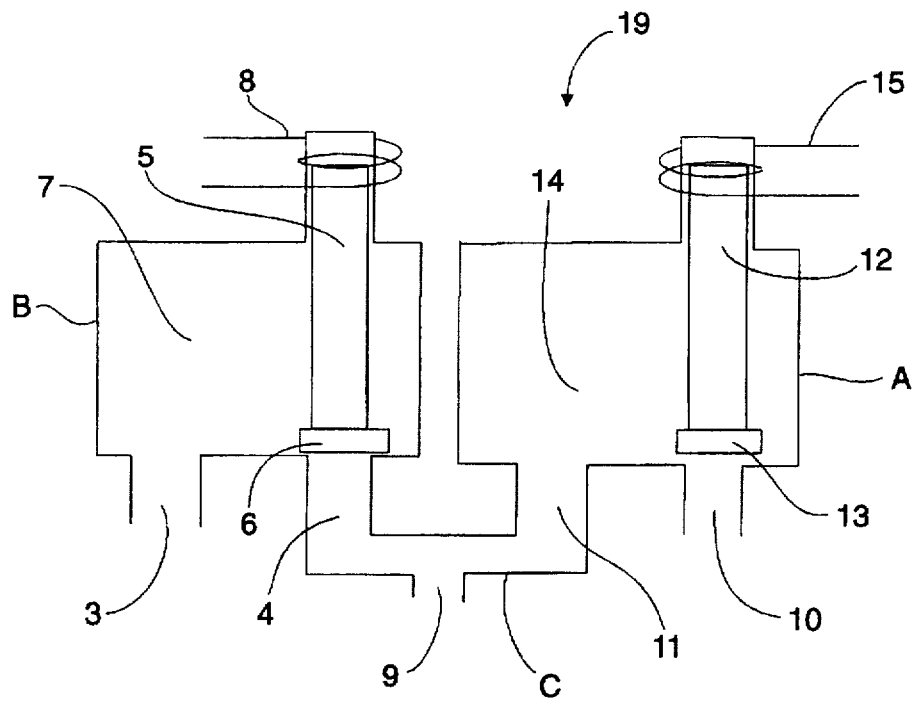
FIG. 1 illustrates a schematic diagram of the pulsation apparatus of this invention.

Now referring to FIG. 1, a pulsator 19 comprises three channels, A, B and C, channel A controlling the vacuum inlet 10, and channel B controlling the atmospheric air pressure inlet 3. Channel A has a chamber 14, and channel B has a chamber 7. A biased, solenoid valve plunger 12 forms a first valve, which is located in chamber 14 of channel A. A biased, solenoid valve plunger 5 forms a second valve, located in chamber 7 of channel B.

Each of the solenoid plungers 5 and 12 is fitted with a respective seal 6 and 13, befitting its valve function, as shown. Chamber 14 has a pressure outlet 11 and a pressure inlet 10. A solenoid coil 15 is actuated to move the solenoid valve plunger 12 against its biasing, in order to open inlet 10. Chamber 7 comprises a pressure outlet 4 and a pressure inlet 3. The solenoid coil 8 is actuated to move the solenoid valve plunger 5 against its biasing, so as to open outlet 4. The outlets 4 and 11 open upon third channel (channel C), having outlet 9.

A control circuit (explained hereinafter, with respect to FIG. 3) ensures that only one of the valves is open at any given time, i.e., only one of the respective solenoid plungers 5 and 12 is lifted at any given time. This prevents the pulsator output 9 in channel C from being simultaneously connected to both the pressure inlet 3 of channel B and the pressure inlet 10 of channel A.

Figure 1A:
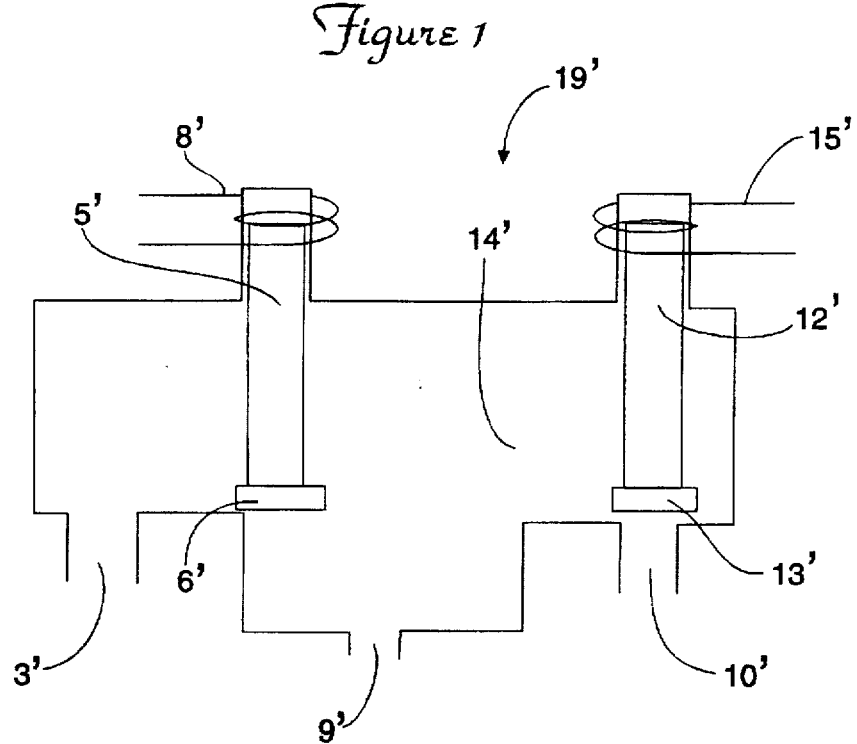
FIG. 1a illustrates a schematic diagram of an alternate embodiment of the present invention.

Now referring to FIG. 1a, an alternate embodiment of the pulsator unit 19 (FIG. 1) is referred to generally as reference numeral 19'. Pulsator 19' comprises vacuum inlet 10' and atmospheric air pressure inlet 3'. Two biased, solenoid valve plungers 12' and 5' form respective first and second valves, which are located on opposite sides of a common chamber 14'.

Each of the solenoid plungers 5' and 12' is fitted with a respective seal 6' and 13', befitting its valve function, as shown. Chamber 14' has a pressure outlet 9' and two pressure inlets, 3' and 10'. A solenoid coil 15' is actuated to move the solenoid valve plunger 12' against its biasing, in order to open inlet 10'. The solenoid coil 8' is actuated to move the solenoid valve plunger 5' against its biasing, so as to open inlet 3'. Since, in this embodiment, the solenoid valve plunger 5' may not have adequate sealing capability, it is desirable to provide additional sealing means, such as springs or other mechanisms known in the art.

Figure 2:
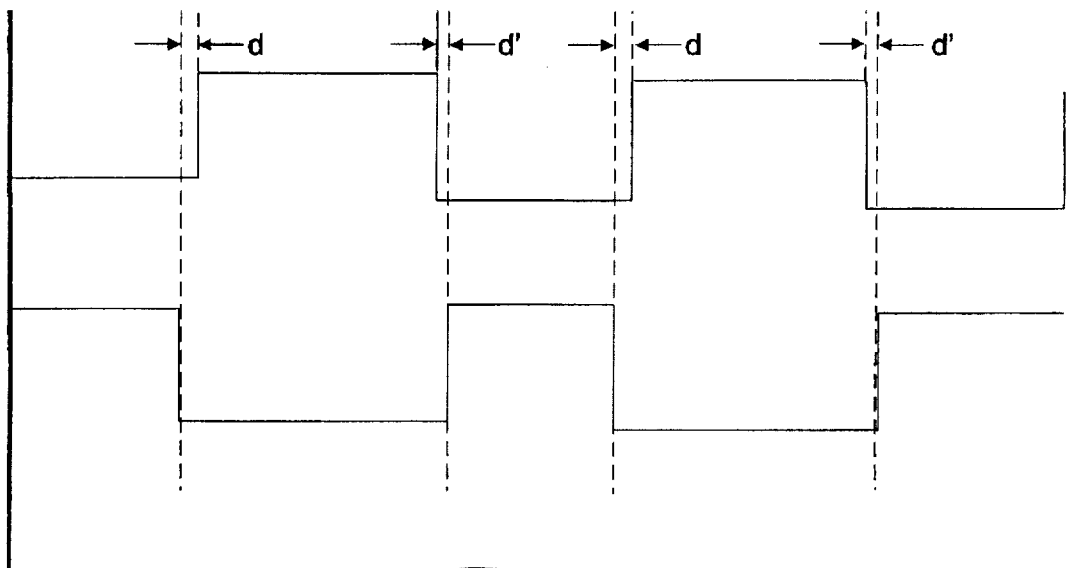
FIG. 2 depicts a diagram of the timing of the vacuum valve A and the pressure valve B of the pulsation apparatus shown in FIG. 1.

The timing diagram of FIG. 2 illustrates the relative timing of the control signals for solenoids 5, 12 (FIG. 1) or solenoids 5', 12' (FIG. 1a). The two control signals actuating the coils 8 and 15 (8' and 15'), respectively, are never in reinforcing, transition phase together. That is, both signals are never simultaneously high. For the optimal operation of the pulsator 19 (19'), a delay of several milliseconds between the falling edge of one signal and the rising edge of the other signal is necessary to enable one of the respective solenoid plungers 5 or 12 (5' or 12') to seat when its corresponding coil 8 or 15 (8' or 15') is deactivated. With respect to the time delay between the A and B signals, "d" is shown as the leading edge, and "d'" the trailing edge. The time duration of a full cycle yields approximately 40 to 70 cycles per minute. The ratio of high durations of the two signals for a given cycle is typically between 50/50 and 70/30.

Referring now to FIG. 3, the control circuit 100 for the pulsator 19 of FIG. 1 or 19' of FIG. 1a is shown. The circuit 100 provides two output signals that are out of phase with each other, as depicted in FIG. 2. This ensures that only one of the solenoid coils 8 or 15 (8' or 15') is energized at any given time. Each output is a cyclic square wave with one portion of the cycle at a voltage low enough to deactivate a solenoid coil, and the other portion of the cycle at a voltage high enough to actuate a solenoid coil.

The two outputs A and B of circuit 100 provide the square waves illustrated in FIG. 2. These outputs are generated by a banc of six timers connected in series, as shown generally by reference numeral 101. The timers 101 are linked, the output of the last timer 107 being connected to the input of the first timer 105. The first timer 105 provides a brief time delay prior to turning on the second timer 102. This ensures that both outputs are, for a short duration, low, so as to enable the deactivating solenoid to properly seat the valve seat associated with its solenoid plunger.

The second timer 102 drives the output A signal high for a period of time that is sufficient to lift the solenoid plunger that it activates.

A third timer 103 then provides the timing for the remaining high signal for output A, but at one-half the original voltage level. This enables the solenoid to be held in place with reduced power consumption.

A fourth timer 104 provides a brief delay between the high level of output A and the high of output B. The fifth and sixth timers, 106 and 107, respectively, provide the same function for output B, as do the second and third timers 102 and 103 for the output A.

The gate drive logic, as depicted by arrows 108, provides the necessary timing signals to the output power stages 109, i.e., to turn the output drivers on and off.

Each output power stage has a current limit function so as to prevent the output from providing power if the output is shorted to ground potential. A "hiccup" current limit feature, illustrated by arrow 110, provides a means of periodically checking to determine if the shorting condition is eliminated and to enable the output power stage to again provide power.

The circuit 100 also has a power conversion section 111 that provides regulated 5- and 12-volt power, as well as a rectifier network 113 to convert the supply voltage from AC to DC.

While the circuit 100 of the preferred embodiment has been disclosed in detail hereinabove, it should be understood that other electronic circuits or other means for providing control, such as pneumatic controls, spring-loaded mechanical controls, etc., can be employed without departing from the scope of this invention.

Figure 4:
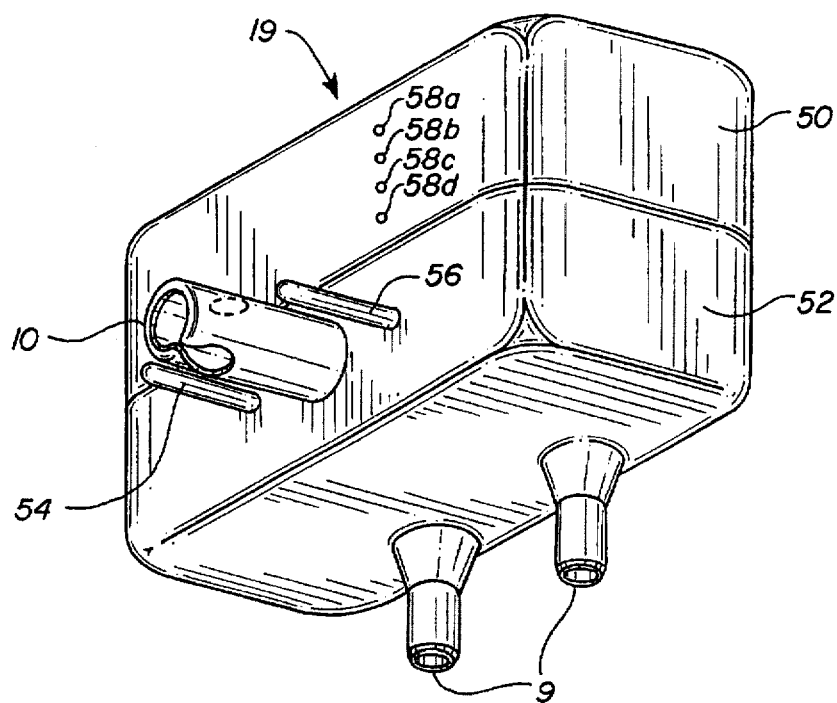
FIG. 4 is a perspective view of the housing used to enclose the inventive pulsation apparatus.
Figure 3A:
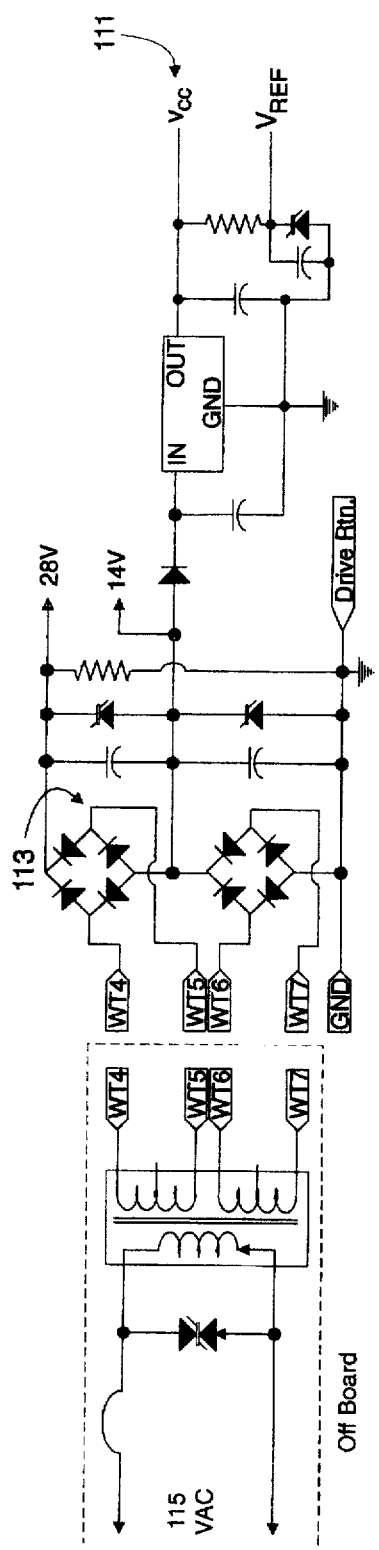
FIG. 3 shows a circuit diagram of the control circuit actuating the pulsation apparatus of FIGS. 1 or 1a, so as to produce the separation in the timing between the respective valves A and B, illustrated in FIG. 2.
Figure 3A:
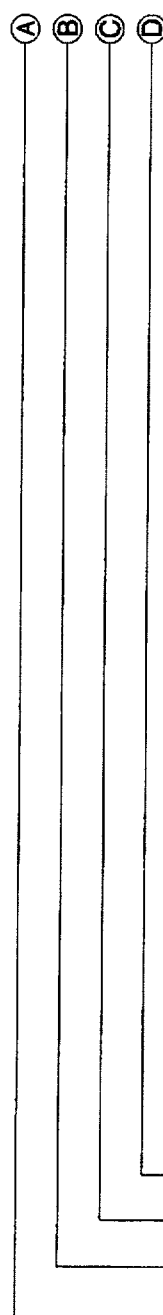
Figure 3A:
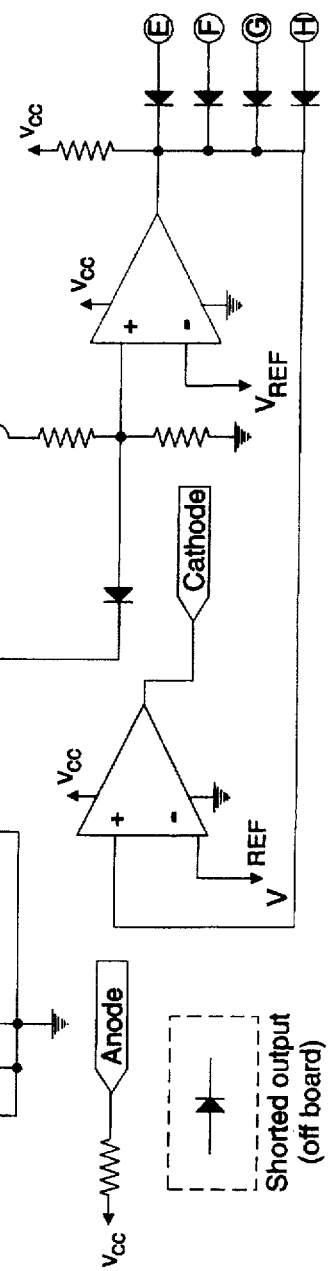
Figure 3B:
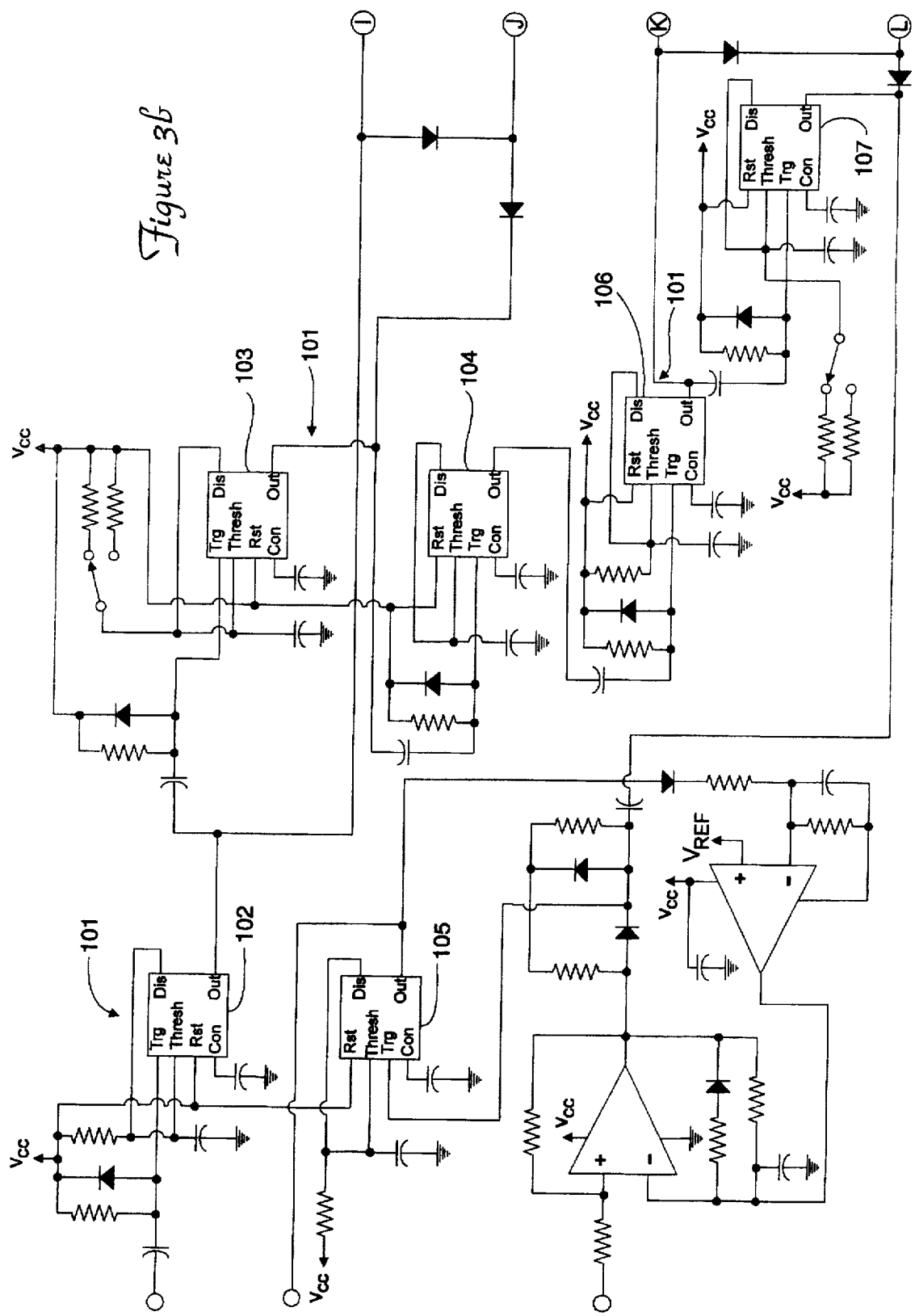
Figure 3C:
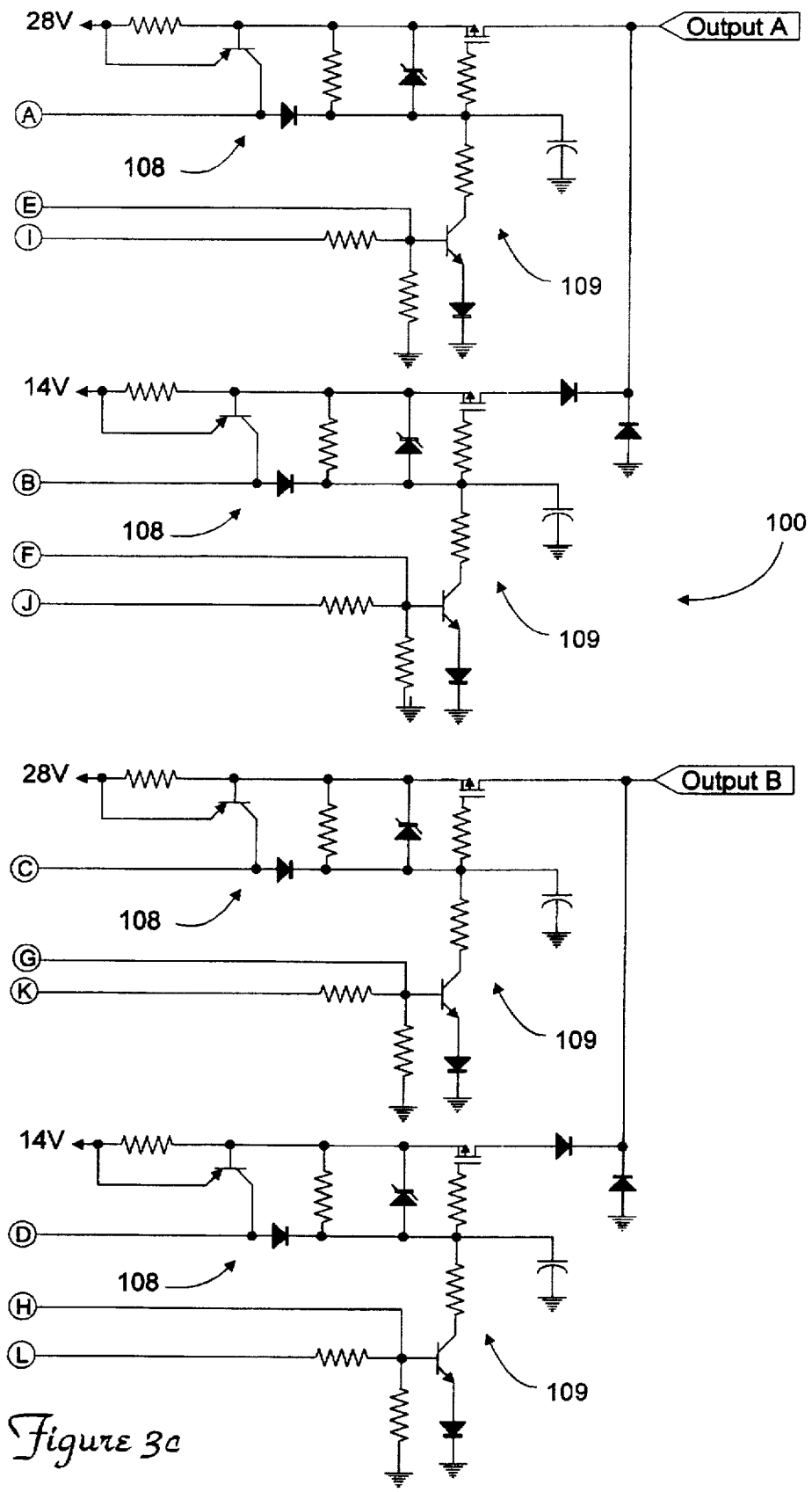

Referring now also to FIG. 4, there is shown the upper housing 50 and lower housing 52 which, when assembled, as shown, contain and protect the pulsator 19 (FIG. 1). Dual pulsator outlet ports 9 extend from lower housing 52, as does vacuum inlet 10, as shown. The configuration of outlet ports 9 is dual in order to facilitate connections to hoses (not shown) and to reduce hose diameters. Electrical contacts 54 and 56 are suitably attached to lower housing 52 on either side of vacuum inlet 10, in order to facilitate proper seating of pulsator 19 with respect to equipment (not shown) downstream thereof and to provide electrical power to solenoids 5 and 12. Four holes 58a–58d are provided in upper housing 50 to connect to inlet 3 (FIG. 1) by suitable means.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A milking apparatus for providing a precise, delineated transition between the pressure and vacuum phases of a pulsator mechanism, comprising:

means defining a pulsator having a first valve and a second valve, each of said first and second valves having a respective inlet and a respective outlet through which air pressure and vacuum can be respectively supplied to a teat-cup milking apparatus;

means defining a first valve control for controlling the supply of air pressure to said teat-cup milking apparatus;

means defining a second valve control for controlling the supply of a vacuum to said teat-cup milking apparatus;

a common outlet operatively connected to both of said valves through which air pressure and vacuum are alternately supplied to said teat-cup milking apparatus from said first and second valves, respectively; and control means connected to said first and second valve controls, said control means respectively actuating and deactivating said first and second valve controls to provide alternating supply of air pressure and vacuum to said common outlet, with said first and second valve controls never being simultaneously actuated, said control means providing a sharp, delineated transition between the alternating air pressure and vacuum supplied to said teat-cup milking apparatus.

2. The milking apparatus in accordance with claim 1, wherein said control means provides a first square wave signal to said first valve control, and a second square wave signal to said second valve control.

3. The milking apparatus in accordance with claim 2, wherein there is a transitional delay between a leading and trailing edge of each of said respective first and second square waves.

4. A milking apparatus comprising a pulsator having a first valve for controlling a vacuum inlet and a second valve for controlling an atmospheric air inlet, means for connecting said vacuum inlet and said atmospheric air inlet to a pulsator outlet that alternately supplies a teat-cup milking apparatus with said atmospheric air and said vacuum, and control means respectively connected to each of said first and second valves for respectively actuating and deactivating the respective first and second valves, said control means providing respective control signals to said first and second valves, said respective signals having a transition therebetween, wherein the respective vacuum and atmospheric air inlets are never simultaneously connected to said pulsator outlet.

5. The milking apparatus in accordance with claim 4, wherein said control means comprises electronic circuitry for providing respective first and second square wave signals to said first and second valves, in order to respectively actuate and deactivate said first and second valves.

6. The milking apparatus in accordance with claim 5, wherein each of said respective square wave signals has leading and trailing edges, and each of said respective square wave signals comprises a transitional time delay between its leading and trailing edges to ensure that said first and second valves are never actuated at the same time.

7. A milking apparatus comprising a pulsator having a first valve for controlling a vacuum inlet and a second valve for controlling an atmospheric air inlet, means for connecting said vacuum inlet and said atmospheric air inlet to a pulsator outlet that alternately supplies a teat-cup milking apparatus with said atmospheric air and said vacuum, and control means respectively connected to each of said first and second valves for respectively actuating and deactivating the respective first and second valves in order to alternately and respectively supply said pulsator outlet with said vacuum and said atmospheric air.

8. The milking apparatus in accordance with claim 7, wherein said control means provides respective first and second signals to said first and second valves in order to respectively actuate and deactivate said first and second valves.

9. The milking apparatus in accordance with claim 8, wherein each of said respective signals has leading and trailing edges, and each of said respective signals comprises a transitional time delay between its leading and trailing edges to ensure that said first and second valves are never actuated at the same time.

* * * * *